US009779372B2

United States Patent
Shoshan

(10) Patent No.: US 9,779,372 B2
(45) Date of Patent: Oct. 3, 2017

(54) SYSTEM AND METHOD FOR ENSURING THE QUALITY OF A HUMAN TRANSLATION OF CONTENT THROUGH REAL-TIME QUALITY CHECKS OF REVIEWERS

(71) Applicant: One Hour Translation, Ltd., Nes Ziona (IL)

(72) Inventor: Ofer Shoshan, Rehovot (IL)

(73) Assignee: One Hour Translation, Ltd., Nes Ziona (IL)

( * ) Notice: Subject to any disclaimer, the term of this patent is extended or adjusted under 35 U.S.C. 154(b) by 168 days.

(21) Appl. No.: 14/750,755

(22) Filed: Jun. 25, 2015

(65) Prior Publication Data

US 2016/0378748 A1    Dec. 29, 2016

(51) Int. Cl.
| | | |
|---|---|---|
| G06F 17/20 | (2006.01) | |
| G06F 17/28 | (2006.01) | |
| G10L 15/00 | (2013.01) | |
| G10L 15/14 | (2006.01) | |
| G06Q 10/06 | (2012.01) | |

(52) U.S. Cl.
CPC ........... *G06Q 10/063112* (2013.01); *G06Q 10/06395* (2013.01)

(58) Field of Classification Search
CPC .... G06F 17/2836; G06F 17/289; G06F 17/28; G06F 17/2818
USPC ................................................. 704/2, 5, 203
See application file for complete search history.

(56) References Cited

U.S. PATENT DOCUMENTS

| | | | |
|---|---|---|---|
| 6,278,967 B1 | 8/2001 | Akers et al. | |
| 6,760,695 B1 | 7/2004 | Kuno et al. | |
| 7,653,531 B2 * | 1/2010 | Sneddon | G06F 17/2854 704/10 |
| 8,185,375 B1 | 5/2012 | Kumar et al. | |
| 8,326,598 B1 | 12/2012 | Macherey et al. | |
| 8,527,521 B2 | 9/2013 | Shoshan | |
| 9,069,759 B2 | 6/2015 | Shoshan et al. | |

(Continued)

OTHER PUBLICATIONS

U.S. Appl. No. 15/391,309 of One Hour Translation, Ltd., filed Dec. 27, 2016.

(Continued)

*Primary Examiner* — Akwasi M. Sarpong
(74) *Attorney, Agent, or Firm* — Carrie Marlene Stroup

(57) ABSTRACT

Computer system, methods, mobile app, and media to guarantee the quality of a language translation of content using a computer network of translators and reviewers communicating in real-time. The accuracy, and hence quality, of the translation is ensured by incorporating "real-time" quality checks comprising randomly inserted errors into an original human translation and evaluating if a reviewer detects the errors. By using a plurality of reviewers for grading each translation, while detecting and eliminating reviewers that are not competent, the quality of a translation is guaranteed. The level of quality is also controlled by increasing (higher quality) and decreasing (lower quality) the type and amount of errors to be detected by the reviewers. Therefore, a computerized system is able to guarantee the quality of a translation into any language and without knowing that language, or the translators who translate it, or the reviewers who grade the translators.

20 Claims, 6 Drawing Sheets

(56) References Cited

U.S. PATENT DOCUMENTS

| | | | |
|---|---|---|---|
| 9,529,797 B2 | 12/2016 | Shoshan et al. | |
| 9,639,527 B2 | 5/2017 | Shoshan et al. | |
| 2002/0198699 A1 | 12/2002 | Greene et al. | |
| 2007/0129935 A1* | 6/2007 | Uchimoto | G06F 17/2836 704/9 |
| 2007/0219774 A1 | 9/2007 | Quirk et al. | |
| 2007/0294076 A1* | 12/2007 | Shore | G06F 17/2836 704/2 |
| 2008/0183459 A1* | 7/2008 | Simonsen | G06F 17/289 704/1 |
| 2008/0195372 A1 | 8/2008 | Chin et al. | |
| 2009/0157386 A1 | 6/2009 | Zhou | |
| 2009/0198487 A1 | 8/2009 | Wong et al. | |
| 2011/0077935 A1 | 3/2011 | Viswanadha et al. | |
| 2011/0082683 A1* | 4/2011 | Soricut | G06F 17/289 704/2 |
| 2011/0307495 A1* | 12/2011 | Shoshan | G06F 17/2854 707/748 |
| 2012/0284015 A1* | 11/2012 | Drewes | G06F 17/2854 704/3 |
| 2012/0330643 A1 | 12/2012 | Frei et al. | |

OTHER PUBLICATIONS

Office Action dated Jul. 19, 2012 in connection with U.S. Pat. No. 8,527,521.

Office Action dated Jun. 25, 2013 in connection with U.S. Pat. No. 8,527,521.

* cited by examiner

SYSTEM AND METHOD FOR ENSURING THE QUALITY OF A HUMAN TRANSLATION OF CONTENT THROUGH REAL-TIME QUALITY CHECKS OF REVIEWERS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE DISCLOSURE

The present disclosure relates to the field of ensuring the quality of human translations of content. More specifically the invention relates to the field of guaranteeing the quality of a human translation of content using a computer network of translation graders (i.e. "reviewers") and automated methods of determining the reliability of each reviewer, and thus translator, in real-time by inserting textual errors into the translation.

BACKGROUND OF THE DISCLOSURE

In today's global economy, obtaining a high quality translation of content (e.g. text, graphic design, document layout, etc.) from an original source language to a target language becomes more and more important. While there are many machine, computer based, translation systems, such as Google® Translate, professional human translators are still required in order to produce accurate, high-quality, translation. Unfortunately, human translators often err and produce inadequate translation. The common solution today is to have a proofreader or editor read the translated content and correct it as needed. This solution is expensive, slow and inadequate.

Language translation of textual content is also a complicated process due to a variety of factors, such as syntax, semantics, and language ambiguity that occurs in various aspects in natural language processing, i.e. lexical ambiguity, case ambiguity and referential ambiguity. Therefore, to ensure a high quality of translation, a translator must translate into a language they are fluent in both written and oral form, and they must also have a sufficient knowledge of the field being translated to have a full understanding of the subject matter. It is no wonder then that translations by professional translators can often be of variable quality; and why machine translations are often riddled with errors.

A bad translation can cause significant damage; sometimes even a single word can drastically change the meaning of the entire paragraph. Machine translation solutions are not accurate enough and the existing methods for evaluating translation quality are cumbersome, slow and expensive. Usually a supervising proofreader checks the translation and corrects it if errors are found. A single proofreader may not locate all the errors in the translation especially if s/he is under time pressure.

The level of quality of a given translation is hard to determine as it is a very subjective matter. In essence, a translation is considered to be good if enough people with control of both the source, i.e. original, language and the target language consider it to be an accurate and succinct translation. But, with the existing methods, submitting a project for proofreading or review by more than one proofreader will result is unacceptable costs in terms of time and money.

Therefore, there is a need within the art of human language translations for an efficient, economical, reliable, and timely method of evaluating the quality and accuracy of the translation simultaneously by a group of professional translators. There is also a need for a system does not require the user (e.g. network translation service provider) to know: 1) the target language; 2) the reliability and accuracy of the human translator; and/or, 3) the reliability and accuracy of any one reviewer within a plurality of reviewers.

The present disclosure is based on a novel computer system, method, and media comprising the use of a plurality of translator reviewers (i.e. reviewers of the quality of a language translation) connected in real-time simultaneously via a computer network (e.g. the Internet) to review the translation and give their rating on its quality. Incompetent reviewers are easily and automatedly identified by the computer system and their quality rating removed when computing a consensus quality rating of the original translation.

SUMMARY OF THE DISCLOSURE

The present disclosure comprises a computer system, methods, and media to guarantee the quality of a language translation of content (e.g. text, images, etc.) using a computer network of translators and reviewers communicating in real-time. The accuracy, and hence quality, of the translation is ensured by incorporating "real-time" quality checks comprising randomly inserted errors into an original human translation and evaluating if a reviewer detects the errors. By using a plurality of reviewers for grading each translation, while detecting and eliminating reviewers that are not competent, the quality of a translation is guaranteed. The level of quality is also controlled by increasing the type (higher quality) and decreasing the type (lower quality) and the amount of errors to be detected by the reviewers.

One or more embodiments of the present disclosure comprise one or more computer systems, computer implemented methods, and non-transitory computer media to guarantee and/or ensure the quality and accuracy of a language translation of content (e.g. text) using a computer network of human translators and reviewers communicating in real-time with a translation service provider over a network, and/or via a mobile app. The accuracy, and hence the quality, of the human translation is ensured by incorporating the "real-time" quality checks as disclosed herein and comprising randomly inserting errors into a translator's original translation and evaluating if a reviewer detects the errors (e.g. see FIG. 4A and FIG. 4B). By using a plurality of reviewers for grading each translation, while detecting and eliminating reviewers that are not able to detect the translation errors, the accuracy and thus the quality of a translation is guaranteed.

The level of quality is also controlled by increasing (higher quality) and decreasing (lower quality) the type and amount of errors to be detected by the reviewers. Therefore, a translation service provider is able to guarantee the quality of a translation into any language and without knowing that language, or the translators who translate it, or the reviewers who grade the translators.

In one or more embodiments, the method comprises: 1) the computer system processor (i.e. "the processor") receiving an "original" human translation (e.g. over a computer network and/or on mobile app) and randomly inserting errors into the translation; 2) transmitting the original, and the "error ridden", translation to a plurality of human translation reviewers (i.e. "reviewers") and receiving back a "reviewer rating" on the quality of the translation for both the original and the error ridden translation; 3) calculating the number of errors detected, and/or missed, by each reviewer within the plurality of reviewers for the error ridden translation (or comparing the grade assigned by a particular reviewer to an average of the other reviewers), and assigning a "competency" rating to each reviewer; 4) when a reviewer's competency rating is below a threshold rating, then omitting this reviewer rating of the original translation; and, 5) calculating the "consensus rating" of the remaining competent plurality of reviewers on the quality of the original human translation (e.g. see FIG. 4A). Additionally, if the consensus rating is below the ensured quality level (a threshold rating), then the translation may be sent to another human translator and steps (1)-(5) repeated.

In another embodiment, the method step (1), is preceded by the computer system processor automatedly breaking the text that is to be translated into parts, and then transmitting it to a human translator (e.g. see FIG. 4B).

An aspect of the various embodiments disclosed herein is the fact that the system does not require the user (e.g. network translation service provider, content author, etc.) to know: 1) the target language; 2) the reliability and accuracy of the human translator; and/or, 3) the reliability and accuracy of any one reviewer within a plurality of reviewers.

Another aspect is the ability to designate the level of quality required for an original human translation by adjusting parameters or factors within the system. The level of quality is adjusted for a variety of factors, such as: amount billed to the customer for the translation service (i.e. higher the fee, higher the guaranteed quality of the translation); amount of time available to conduct the translation; importance of content (e.g. text) that is being translated and/or the customer (e.g. intended use of translation—e.g. legal contract versus advertisement); and so forth. Parameters adjusted comprise, by way of non-limiting examples: the number of reviewers used in rating the quality of the original human translation; altering methods of randomly inserting errors into the original translation (omitting strings; switching strings; etc.); altering the number of errors to be detected, and/or missed, by a reviewer (e.g. higher the number of errors, higher the quality rating); etc.

Another aspect is the ability to calculate and assign a competency rating to a reviewer by a variety of methods, such as (e.g. see FIG. 5): 1) automatedly calculating the number of errors detected, and/or missed, by a reviewer and assigning a grade; 2) calculating the "reviewer relative rating" of the translation (e.g. "Good, OK, Bad"), and comparing this to the consensus, average, mean, median, or mode rating of the other reviewers; 3) calculating the competency rating using different types of errors and assigning a relevancy weight designating the importance of each type (e.g. reviewer detection of a missing string is weighed higher than detection of switched strings, or vice versa).

Another aspect of the present disclosure is to objectively determine the competence of a specific reviewer within a plurality of reviewers.

Another aspect is to objectively determine if the performance of a specific reviewer has increased or decreased over time so that appropriate action can be taken to remedy the situation.

The various embodiments may further comprise a computer program product tangibly embodied in a computer-readable storage device and comprising instructions that, when executed by a processor, perform one or more methods disclosed herein. For example, the computer program product may comprise a mobile application (i.e. a mobile app) with a translation module accessible on a customer's, a translator's and/or a reviewer's (client) electronic computing device comprising a non-transitory computer readable storage medium comprising instructions, the instructions being operable to enable the electronic computing device to perform all of or parts of the steps of the methods disclosed herein. The mobile app of the present disclosure that is used on a customer's electronic computing device has the ability to electronically send and receive communications for ordering a translation (e.g. about project notifications), and may further communicate directly with one or more translator's electronic computing device, and/or one or more reviewer's electronic computing device.

The mobile app of the present disclosure on a reviewer's electronic computing device can also: receive project notifications; view the original translation and the error-ridden translation and provide a quality rating for both and/or identify errors in the error-ridden translation; invite other reviewer's to rate a translation project; and/or electronically communicate directly with a translator and/or a customer device.

And the mobile app of the present disclosure on a translator's electronic computing device can: receive a project notification comprising content to translate; input and transmit the translation; fix existing translations; invite other translators to the project; and/or communicate directly with the customer and one or more reviewers of their project.

The mobile app may also be used, for example, by a content author who desires to ensure the quality of a translation of his content that was translated by him or another translator, by directly sending the translation to a plurality of reviewers after the mobile app (or networked computer) automatedly inserts errors into the translation. The mobile app will then collect the plurality of reviewers' ratings of the original content and the error-ridden content, and automatedly compute a competency rating for each reviewer and a consensus rating for the translation by the designated competent reviewers. The mobile app will then display on the content author's electronic computing device whether the translation is of the requested level of quality, and if not, recommend that the author obtain another translation from a different source, such as another translator within the system's network of translators. Or, the mobile app can be setup to automatically order another translation from a different translator, such as one who specializes in the target language and subject matter of the content.

BRIEF DESCRIPTION OF THE DRAWINGS

The invention and its different aspects and advantages will be better understood from the following detailed description of preferred embodiments of the invention with reference to the following drawing.

DETAILED DESCRIPTION OF EXEMPLARY EMBODIMENTS

Glossary of Terms

Figure 1:
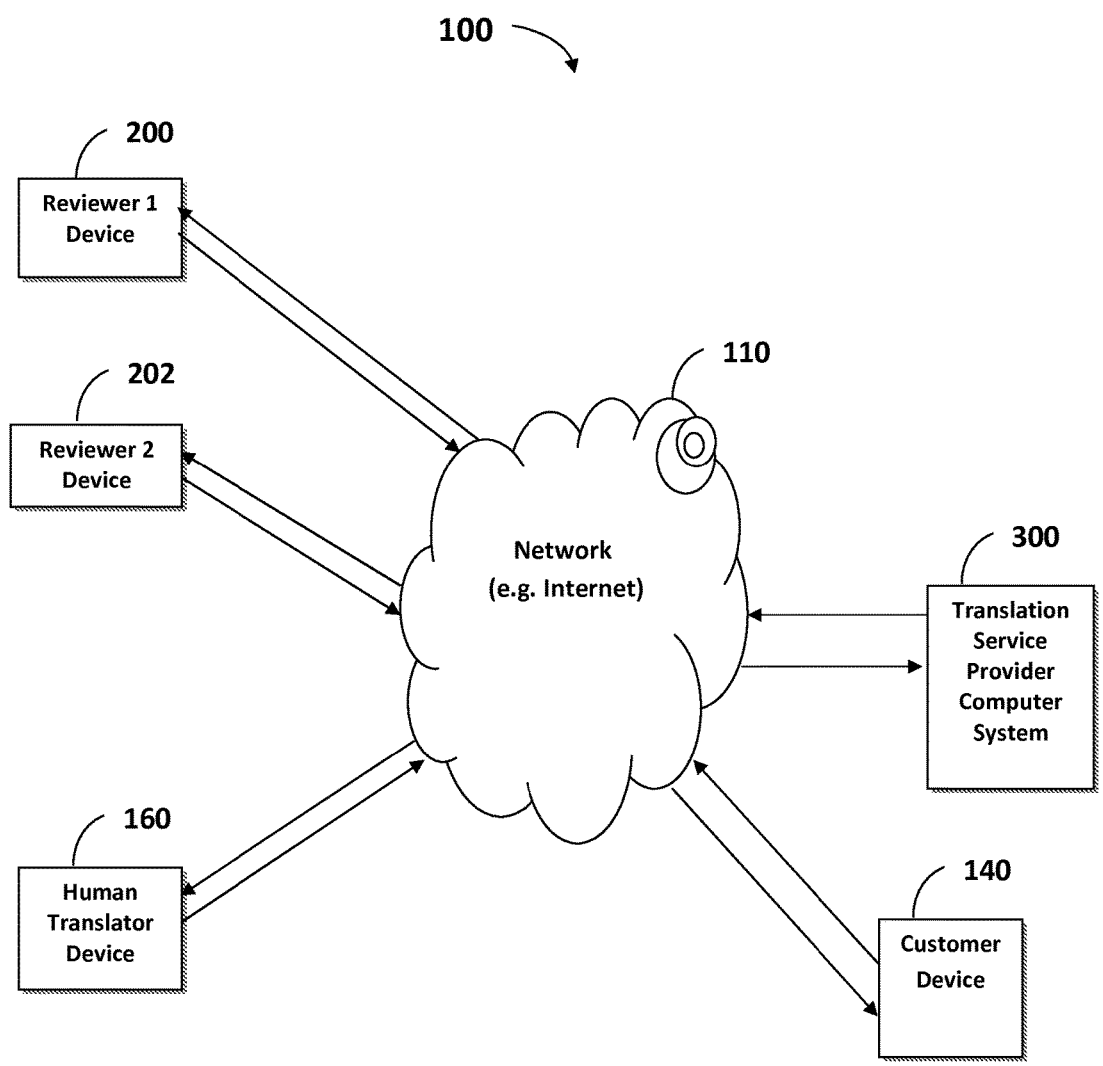
FIG. 1 is a block diagram representing an embodiment of the computer system comprising a translation service provide system, a translator computing device, a plurality of reviewers computing devices, and a customer computing device, all communicating over a network.

As used herein, the term "Electronic Computing Device" refers to any electronic communications device comprising a central processing unit (i.e. processor) with the Internet connectivity, such as: laptops, desktops, tablets, iPads, smartphones, cell phones, personal digital assistant devices, and the like.

As used herein, the term "Content" refers to any form of digital media that can be translated from an original, source language to a target language. By way of non-limiting examples, content to be translated may comprise one or more of: a textual document, an audio recording, text within images, the textual and image layout of a document or webpage, etc., and any combination thereof. It is understood that one of skill in the art could readily modify the disclosure herein for textual translations to include all forms of content translations.

As used herein, the term "Software" refers to computer program instructions adapted for execution by a hardware element, such as a processor or CPU, wherein the instruction comprise commands that when executed cause the processor to perform a corresponding set of commands. The software may be written or coded using a programming language, and stored using any type of non-transitory computer-readable media or machine-readable media well known in the art. Examples of software in the present invention comprise any software components, programs, applications, computer programs, application programs, system programs, machine programs, and operating system software.

As used herein, the term "Module" refers to a portion of a computer program or software, such as a mobile app, that carries out a specific function and may be used alone or combined with other modules of the same program. The module may comprise a native application, a web application, or a widget type application to carry out the methods of detecting and electronically transmitting untranslated character strings. In a one embodiment, a native application is installed on the customer's, reviewer's and/or translator's electronic computing device, wherein it can be downloaded automatically from the Internet. It may be written in a language to run on a variety of different types of devices; or it may be written in a device-specific computer programming language for a specific type of device. In another embodiment, a web application resides on the system server and is accessed via the Internet. It performs basically all the same tasks as a native application, usually by downloading part of the application to the device for local processing each time it is used. The web application software is written as Web pages in HTML and CSS or other language serving the same purpose, with the interactive parts in JavaScript or other compatible language. Or the application can comprise a widget as a packaged/downloadable/installable web application; making it more like a traditional application than a web application; but like a web application it uses HTML/CSS/JavaScript and access to the Internet.

As used herein, the term "Application Program Interface (API)" refers to a set of computer programming instructions, for accessing a web based software application or web tool.

As used herein, the term "A System" may be used to claim all of, or parts of, the aspects of the present disclosure wherein it refers to the entire configuration, or parts of, the networked based human translation service, e.g. all hardware and software used in all scenarios. Preferred embodiments are illustrated in the system architectures of FIGS. 1-3.

As used herein, the terms "Processing," "Computing," "Calculating," "Determining," "Establishing", "Analyzing", "Checking", or the like, may refer to operation(s) and/or process(es) of a computer, a computing platform, a computing system, a computer central processing unit (CPU), or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

As used herein, the term "Original Human Translation" and "Original Translation" refers to a translation of content (e.g. text) performed by a human translator from a source language to a target language, and wherein the computer system processor has not inserted errors into the translation.

As used herein, the term "Error-ridden Translation" refers to an original (human) translation wherein the computer system processor has randomly inserted errors into it to test the competency of the reviewers. The types of errors may also be assigned a relevancy weight designating the importance of each type (e.g. translator detection of a missing string is weighed higher than detection of switched strings, or vice versa). As a result, higher weighted error types will therefore have a higher impact on the reviewer's competency rating.

System Architecture

The various embodiments disclosed herein may be used in conjunction with, or in lieu of, one or more methods, systems and media for rating human translators and reviewers as disclosed in U.S. Pat. No. 8,527,521 issued Sep. 3, 2013 to Ofer Shoshan entitled "System and Method for Evaluating the Quality of Human Translation Through the Use of a Group of Human Reviewers", the entirety of which is herein incorporated by reference.

FIG. 1 is a block diagram representation of a computer implemented system 100 of one embodiment of the present disclosure. System 100 comprises a translation service provider computer system 300 communicating via a network 110 (e.g. the Internet) with: 1) a customer computer system and/or electronic computing device 140 for ordering a human translation from system 300; 2) a plurality of human translator electronic computing devices 160 to generate and transmit back to system 300 an "original human translation"; and, 3) a plurality of translator reviewers (i.e. "reviewer's") electronic computing devices 200, 202, etc. to assess the quality of the transmitted translation. In another embodiment, a mobile app is installed on the customer's device 140, the translator's device 160, and/or the reviewers' devices 200, 202 to carry out some or all of the functions of computer system 300.

In the various embodiments, the computing devices-systems 140, 160, 200, 202, and/or 300 communicate via network 110, which comprises a local area network (LAN) or a wide area network (WAN), or a network connection may be made to via an external computer (for example, through the Internet using an Internet Service Provider), and using wired, wireless, and terrestrial or satellite links.

The "quality rating" is assessed by the system 300 processor to determine if it is sufficient (e.g. meets a threshold rating—Excellent, Fair, Good, etc.). In an embodiment, when the processor decides that the quality rating is too low or is insufficient (e.g. does not comply with the customer's order), then the system 300 automatedly re-orders the translation from another human translator. And when the "quality rating" is sufficient, it may be transmitted to the customer device 140 to provide proof of compliance with guaranteeing the quality of the translation ordered.

Another system embodiment includes the use of a mobile app by a user-customer wishing to check the quality of a human translation without contracting with a translation service provider computer 300. The customer device 140 would receive a translation from a translator device 160. The mobile app installed on the customer's (i.e. user's) device 140 would automatedly insert errors into the translation (or receive an error ridden translation from the system 300), and then transmit the original translation and the error-ridden translation directly to a plurality of reviewers' devices 200, 202, etc. via the network 110. Alternatively, a mobile app installed on the translator's device 160, and/or installed on the reviewers' devices 200, 202, would automatedly insert errors into the original translation to generate the "error ridden translation".

The user's device 140 would then receive back the reviewers' consensus rating of the quality of the original translation. If the consensus rating on the quality of the translation did not meet the user's desire, then the user could manually, or the mobile app would automatically, order the translation from another human translator and repeat the process of distributing the translation to a plurality of reviewers.

Figure 2:
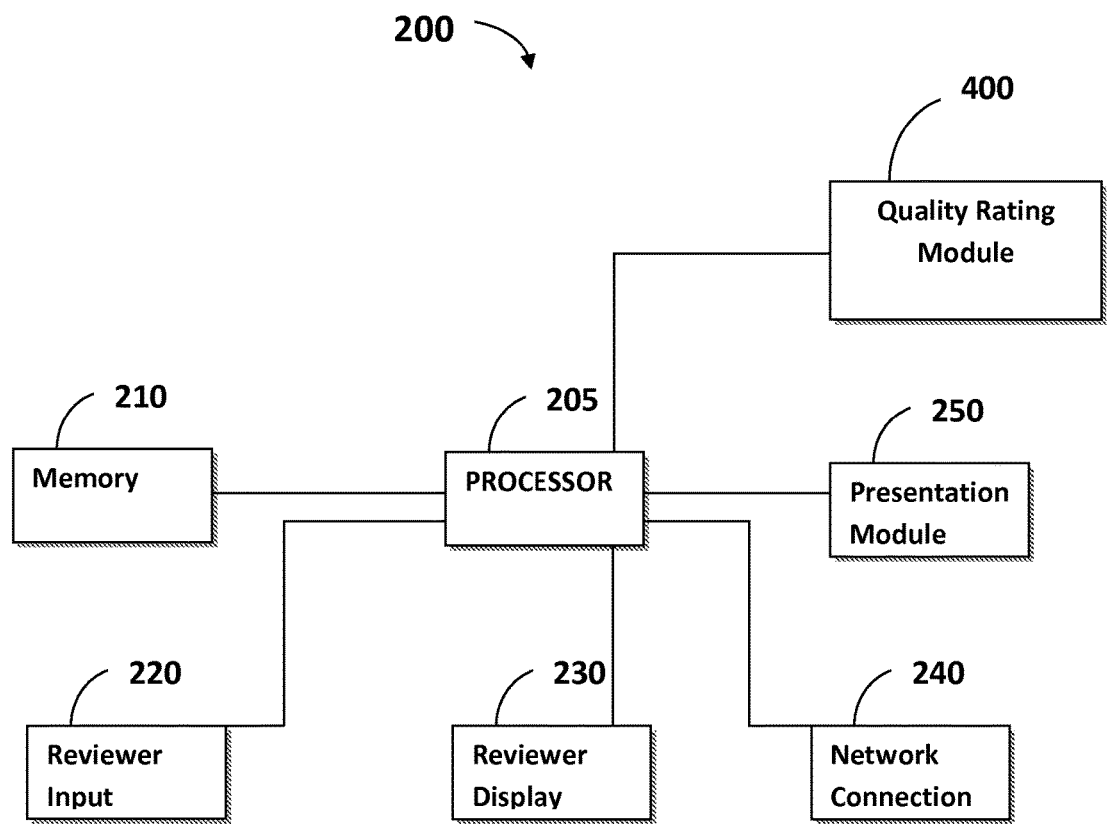
FIG. 2 is a block diagram representing one embodiment of the reviewer's electronic computing device that is used to check the translation project and provides a rating on the quality of the human translation.

FIG. 2 is a block diagram representation of the reviewer's electronic computing devices 200 and 202 in an exemplary embodiment, in which it is understood that there may be a plurality of reviewer devices numbering more than the exemplified 200, 202. The reviewers' device 200 and 202 each receive a project notification comprising the original human translation from the central computer system 300, and/or directly from the translator device 160, and/or directly from the customer device 140, and display it to the reviewer. Devices 200 and 202 then receive the reviewer's input of the quality rating of the original translation, and the error-ridden translation (or the identification of the errors) and electronically transmit it back to the central system 300 and/or directly to the customer's device 140 and/or the translator's device 160.

The reviewer electronic computing device 200 and 202 (e.g. laptop, tablet, desktop PC, smartphone, PDA, etc.) has one or more processing units (CPUs) 205, one or more memories 210, user input devices—keyboard & mouse—220, graphical user interface (GUI) 230 to display the source text, the original human translation and the error-ridden translation, and a network connection 240. It may further comprise a Presentation module 250 in the mobile app, or accessible via the network, to provide functionality to display side-by-side, and thus be able to compare, the source text to the original translation and/or the error ridden translation.

The reviewer device 200 and 202 also has installed on, or accessible via the network 110 from the translation provider computer system 300, a "Quality Rating Module" 400, e.g. within the mobile app. The Quality Rating Module 400 provides functionality to receive the reviewer's input for the identification of errors in the error-ridden translation, and to receive the input for the reviewer's quality rating of the original human translation. The Quality Rating module when installed on the system 300 (e.g. FIG. 3) and/or the device 200, 202 (as a mobile app), may further comprise the ability to automatedly: 1) divide the translation into parts (e.g. sentences, paragraphs, strings) before or after the source text is translated; and, 2) insert errors into the parts that the reviewer then needs to detect.

Figure 3:
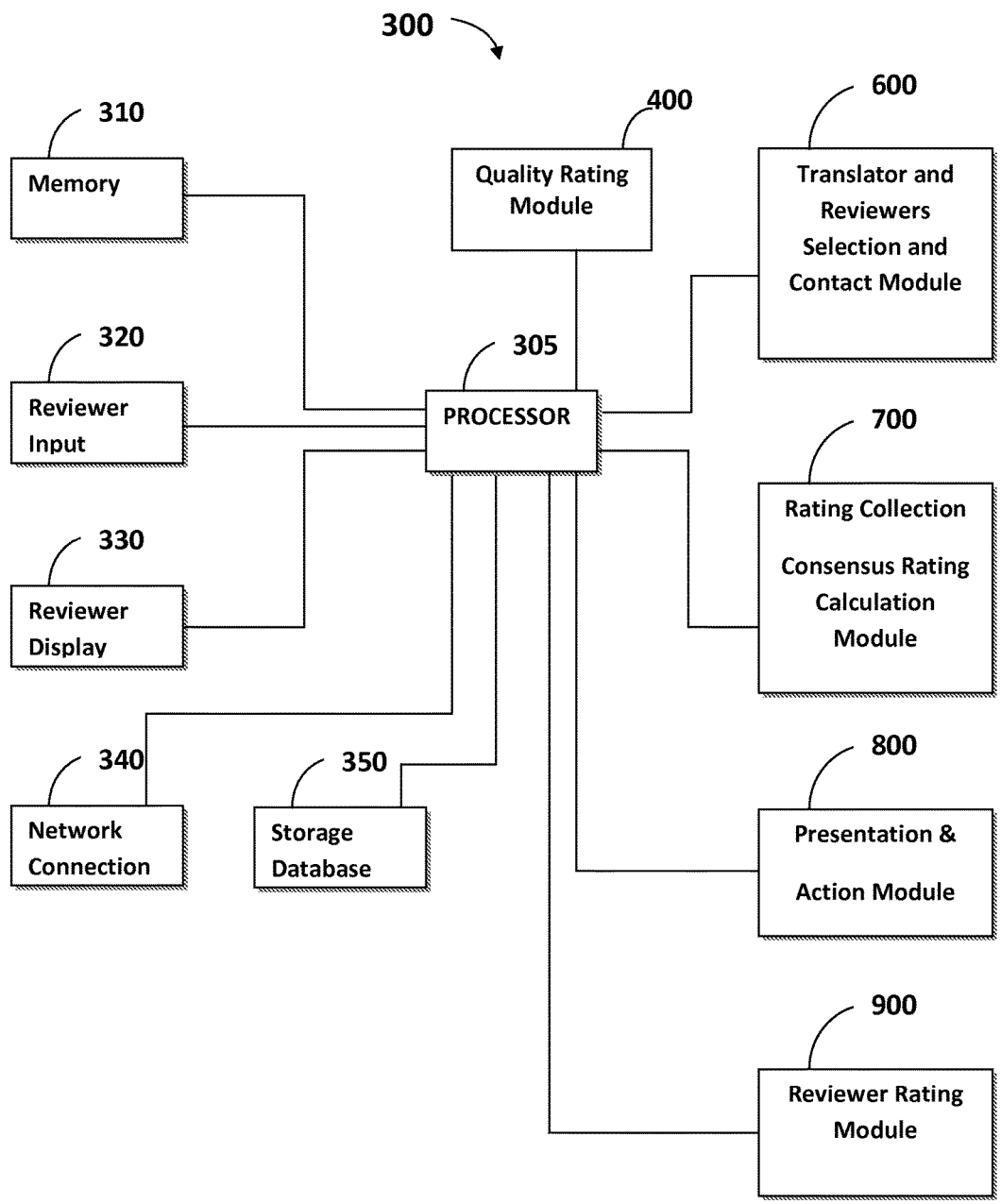
FIG. 3 is a block diagram representing one embodiment of the computer system of the translation service provider, or the mobile app installed on a reviewer's device, comprising optional features.

As illustrated in FIG. 3, the translation provider computer system 300, and/or the mobile app, further comprise main processing modules for selecting qualified translators and reviewers, contacting them via the network, collecting the reviewers' ratings, calculating a competency rating of each reviewer based on their error-ridden test results, calculating a quality rating on the original translation from a consensus of the competent reviewers, and electronically transmitting the quality rating to the customer electronic computing device 160. Computer system 300 has one or more processing units (CPUs) 305, one or more memories 310, user input devices—keyboard & mouse—320, user display 330, Network connection 340, and storage database 350, e.g. any server computer. The storage database 350 comprises a plurality of human translators' and/or reviewers' records comprising the identity of each translator's and reviewer's language and subject matter expertise, availability, contact information, etc.

The computer system 300, and/or the mobile app running on a user's device, may further execute a Reviewer Select and Contact module 600, which is used to select qualified reviewers based on their language and subject matter expertise, and to perform the review of the translation. It also identifies and electronically contacts a plurality of reviewers for a specific translation project.

In the various embodiments, the translation project is sent from the customer device 140 to computer system 300, or directly to translator device 160; and then from the translator device 160 to the system 300 or directly to the reviewers' devices 200, 202. It is understood that any combination of transmitting the communications comprising the translation and rating is easily adaptable to the skilled artisan. The translation project is analyzed to collect project characteristics, such as source language, target language, type of translation, length, files types etc. The computer system 300, and/or the mobile app, creates a project profile based on the collected project characteristics that is used to select the reviewers to perform the quality rating. Reviewers are selected based on the project profile of characteristics and on their individual profile stored in the reviewers' data-base 350 connected to or stored on the computer system 300, and or a user's device memory. An individual reviewer profile may comprise a reviewer's areas of expertise, preferences for types of projects, availability, etc. A reviewer is selected if his/her skills meet the project meta-data requirements, e.g. source language and target language, and other parameters like previous reviewer score or competency rating. Each reviewer is alerted of the new translation project by use of electronic communication, for example, email, mobile text message, web-page, Instant messenger and potentially other communication means.

Computer system 300, or the mobile app, may further contain the Rating collection and Consensus rating calculation module 700. This module may be used in conjunction with one or more other modules (e.g. the Quality Rating module 400) to collect ratings from competent individual reviewers and then calculate a quality rating.

Computer system 300, or the mobile app, may further contain the Presentation and Action module 800 to display side-by-side, and thus be able to compare, the source text to the original translation and/or the error ridden translation. It may further provide functionality to send the results to the customer device 140 over the network 110 and take predefined action if the quality rating is too low, such as automatically ordering another translation from a different translator and repeating the process of having a plurality of reviewers grade the translation while identifying and eliminating the quality rating of incompetent reviewers.

Computer system 300, or mobile app, may further contain the Reviewer Score module 900 that is used in conjunction with one or more other modules (e.g. the Quality Rating module 400). This module may be used to review the score, or competency rating, generated by the Quality Rating module 400, and transmit and display a reviewer's results to his/her device 200, 202. The score or rating is subsequently used when reviewers are selected to evaluate and rate the quality of future translation projects.

Non-Transitory Computer Readable Storage Device and/or Media:

The various embodiments disclosed herein may further comprise a non-transitory computer readable storage device or media, which is a physical storage device readable by a machine. The computer readable storage device can store data that is accessible by a computer, such as system 300 or device 140, 160, 200, 202, etc. The computer readable storage device is preferably a non-removable hard drive, but may include a backup Universal Serial Bus (USB) flash drive that can be easily removed and physically transferred to a computer. Other examples include devices such as a magnetic cassette, a flash memory card, a digital video disk, a compact disc, an optical disc, a Bernoulli cartridge, a random access memory (RAM) card, read only memory (ROM) card, and other such storage devices.

The applications or algorithms or modules disclosed herein (e.g. "Quality Rating", "Presentation" modules, etc.) can be stored on computer readable storage device or media (CD, DVD, hard drive, portable storage memory, etc.) of the computing device 200, 202, and/or system 300 and executed by the them.

In general, another innovative aspect of the subject matter described in this specification can be implemented in a computer program product tangibly embodied in a computer readable storage device and comprising instructions that, when executed by a processor, perform one or more methods disclosed herein.

Quality Rating Methodology

Figure 4A:
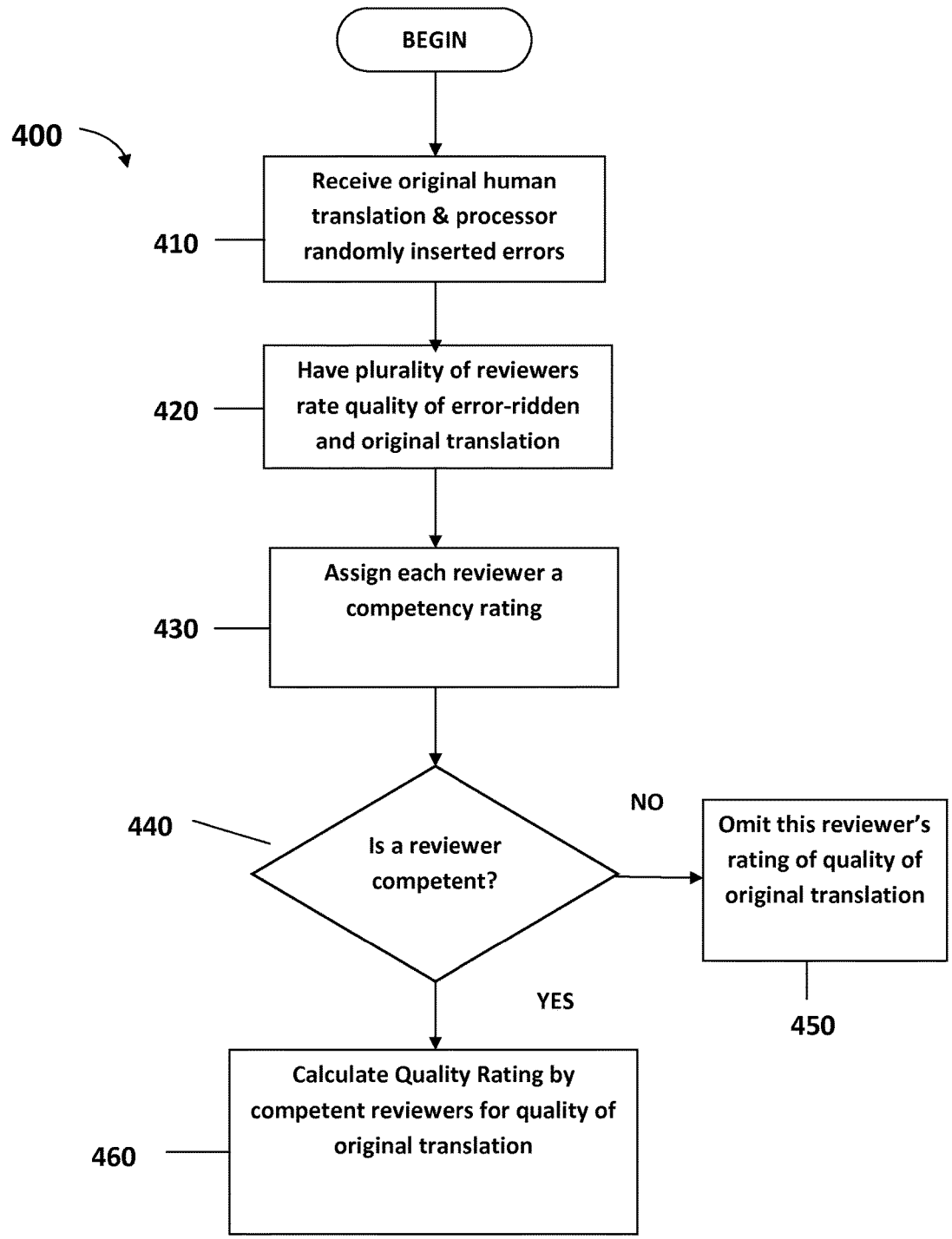
FIG. 4A is an exemplary logic flow and functional block diagram illustrating one embodiment of the method of the present disclosure.
Figure 4B:
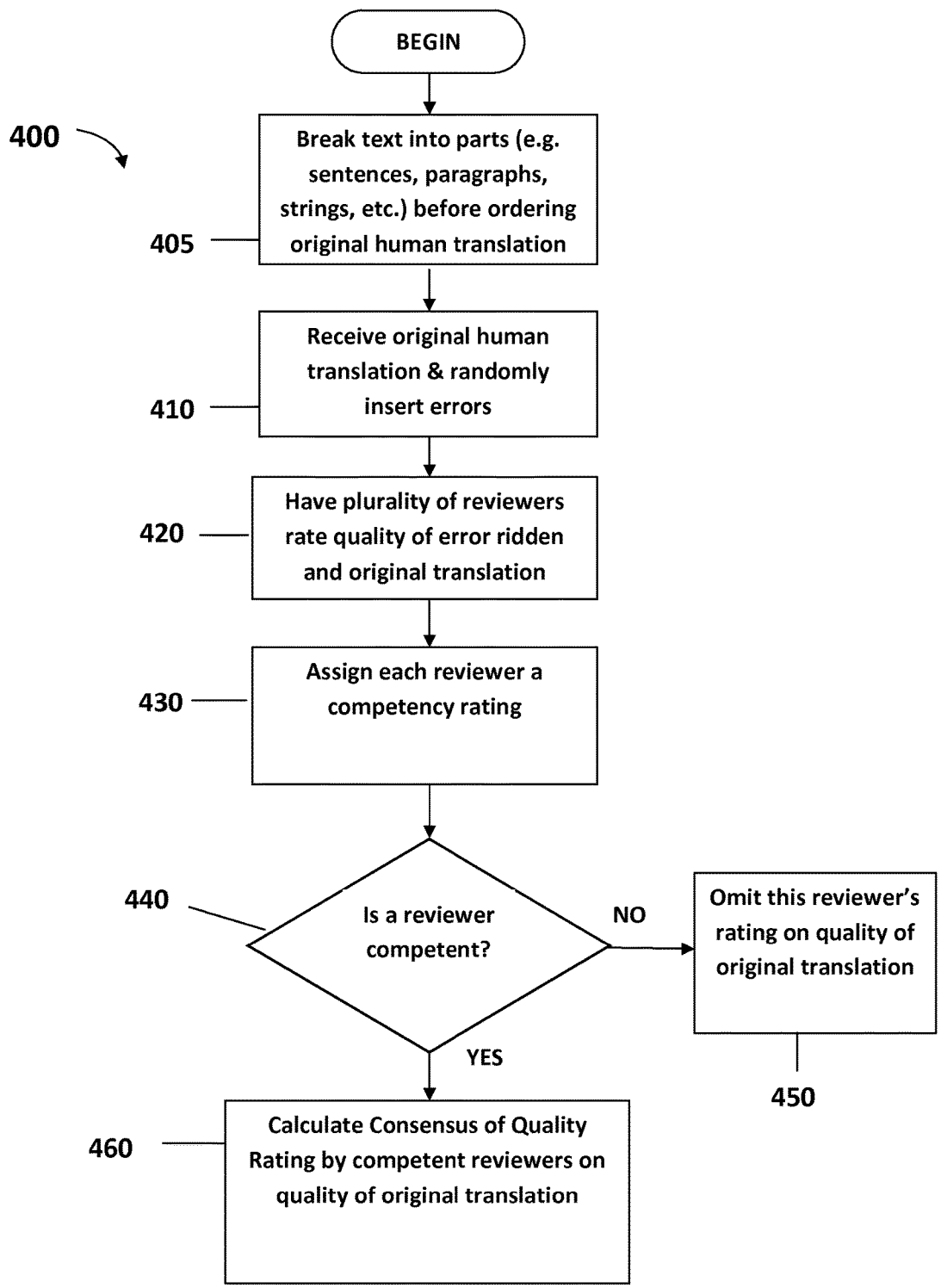
FIG. 4B is an exemplary logic flow and functional block diagram illustrating another embodiment of the method of the present disclosure comprising automatedly breaking the text into parts before it is translated.
Figure 5:
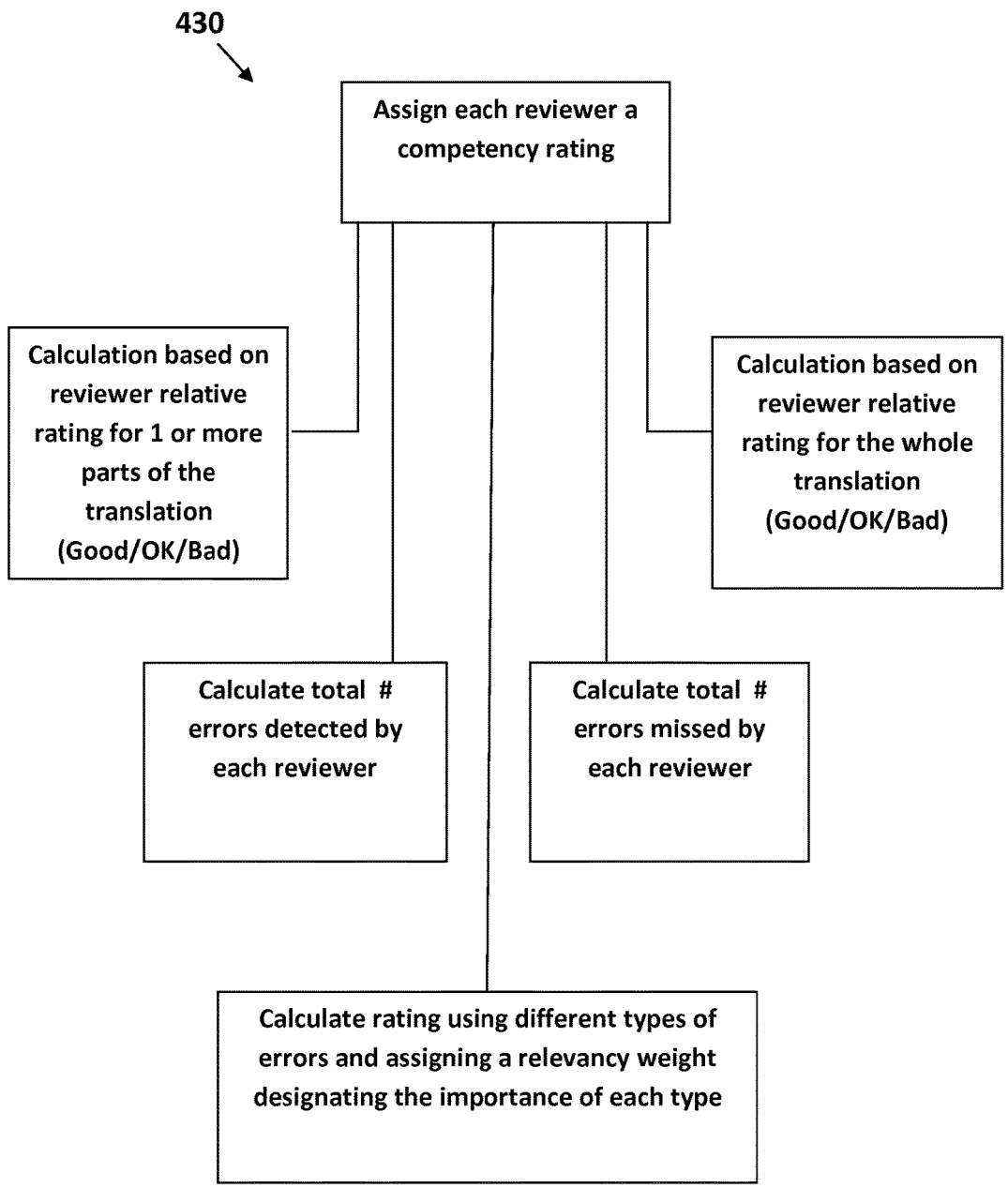
FIG. 5 illustrates exemplary embodiments of alternative methods for assigning each reviewer a competency rating.

Although the disclosure herein for the flowcharts of FIGS. 4A, 4B and 5 cover textual translations, one skilled in the art could readily adapt the teachings to the translation of any type of content. It is further understood that the steps disclosed in FIGS. 4A, 4B, and 5 may be executed by one or more of the modules in FIGS. 2 and/or 3.

FIGS. 4A and 4B are flowcharts illustrating computer steps conducted by the computerized system 100 in an exemplary embodiment comprising the use of the Quality Rating Module 400 alone or with one or more other modules for FIGS. 2 and/or 3. In step 410, a reviewer's computing device 200, e.g. smartphone with the mobile apps of the present disclosure installed thereon, and/or the translation service provider computer system 300, receives the original human translation from the translator computing device 160, in response to the translation that was ordered from the customer computing device 140 (e.g. via system 300 or directly or directly via the mobile app). The reviewer's device 200 and/or the system 300 then randomly and automatedly inserts errors into the translated text to generate the "error ridden translation".

The translated text may further be broken into "parts" before or after it is translated, the parts comprising one of more of: sentences, paragraphs, strings, etc. This may occur, for example: before the source text is sent to be translated, the mobile app on the customer's device 140, and/or the system 300, divides the text into parts (e.g. see FIG. 4B, step 405). Or the text may be broken into parts after the original human translation is received: back at the customer's device 140; at the reviewers' devices 200, 202; and/or at the system 300 (e.g. see FIG. 4A, step 410). Or the text may be inherently broken into parts because of its source (e.g. translations of websites and mobile applications).

The customer's device 140 and/or the translator's device 200 with the mobile app installed thereon, and/or the system 300, may also insert a wide variety of types of errors into the text to produce the "error-ridden" translation or text. By way of non-limiting examples: a machine translation may be substituted for a part; different parts may be swapped within the same translation; specific words may be substituted with known words that are commonly mistranslated; and so forth. The Quality Rating Module 400 may further comprise computer code designed to insert errors specific to: different types of translations, different levels of quality required, different types of customers, and so forth.

In step 420, the customer's device 140, and/or the system 300, transmits the original human translation and the error-ridden translation (parts) to a plurality of reviewer's electronic computing device 200, 202, etc. The reviewers are also instructed to rate the quality of the original human translation (e.g. percentage of 100%; grade A-F; Good/OK/Bad), and to find errors in the error-ridden translation. The number of reviewers that are tasked depends on a variety of factors, such as: level of quality needed for the original human translation (e.g. higher the qualities, then more reviewers are tasked); availability of reviewers for specific target language and subject matter expertise of text topic; time allowed to deliver the translation to the customer; etc.

In step 430, customer's device 140 and/or the system 300 receives the reviewers' quality rating for the original human translation, and their error identification input. Based on their test results for detecting the errors, each reviewer is assigned a Competency Rating (score) based on a variety of methods, which comprise by way of non-limiting examples (e.g. see FIG. 5): 1) automatedly calculating the number of errors detected, and/or missed, by a reviewer and assigning a grade; 2) calculating the "reviewer relative rating" of the translation (e.g. "Good, OK, Bad"), and comparing this to the consensus rating (average, mean, median, mode, etc.) of the other reviewers; 3) calculating the competency rating using different types of errors and assigning a relevancy weight designating the importance of each type (e.g. reviewer detection of a missing string is weighed higher than reviewer detection of switched strings, or vice versa).

In step 450, when a reviewer's competency rating is not at or above a designated threshold level as required for a particular translation project (e.g. falls below a guaranteed threshold standard), then the reviewer's quality rating of the original human translation is omitted from the record.

In step 460, the system 300 processor calculates a Consensus Quality Rating (score) based on the ratings of the remaining competent reviewers. The calculation may comprise computations well known in the art, such as the mean, median, average, mode or it may comprise a customized algorithm that is encoded in the Quality Rating Module 400. If the Quality Rating is below a required threshold level, then the system can re-order the translation (automatedly or via a system administrator or user). The source text is sent to a different translator and steps 410-460 are repeated as many times as required. The final Quality Rating may then, optionally, be transmitted via the network 110 to the customer electronic computing device 140 along with the original human translation in compliance with ensuring that the quality guaranteed has been met.

The customer's device 140 and/or the system 300 may also adjust the quality needed for the original human translation by adjusting parameters. Parameters adjusted comprise, by way of non-limiting examples: the number of reviewers used in rating the quality of the original human translation; altering methods of randomly inserting errors into the original translation (omitting strings; switching strings; etc.); altering the number of errors to be detected, and/or missed, by a reviewer (e.g. higher the number of errors, higher the quality); etc.

A quality level is designated automatically by the customer's device 140 and/or the system 300 and/or manually by the system administrators, based on a variety of factors, such as: amount billed to the customer for the translation service (i.e. higher the fee, higher the guaranteed quality of the translation); amount of time available to conduct the translation; importance of text that is being translated and/or the customer (e.g. intended use of translation—e.g. legal contract versus advertisement), and so forth.

CONCLUSION

The results of the operation of the novel process described above is a fast and efficient way to order and receive a human translation while ensuring its quality, even if the user and/or system administrator is not proficient in the target language. The aforementioned flowchart and diagrams illustrate the architecture, functionality, and operation of possible implementations of systems, methods, apparatuses, devices and media according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Likewise, the terms "plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Although various features of the invention may be described in the context of a single embodiment, the features may also be provided separately or in any suitable combination. Conversely, although the invention may be described herein in the context of separate embodiments for clarity, the invention may also be implemented in a single embodiment.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

And lastly, the trademarks, website names, programming language names, etc. that are used in the present disclosure are the property of the respective owner companies and are used herein for illustrative purposes only. The inventor does not claim any rights on it.

What is claimed is:

1. An Internet based translation system for ensuring the quality of human content translations from a source language to a target language, comprising:
   a. a system server, comprising:
      i. one or more processors communicatively coupled to a memory;
      ii. one or more non-transitory computer-readable storage devices comprising instructions for processor(s), wherein said processors are configured to execute said instructions to perform operations comprising;
         receiving by the processor an original human translation over a computer network and randomly inserting errors into the original human translation to create an error ridden translation;
         transmitting by the processor the original translation, and the error ridden translation, to a plurality of human reviewers and receiving back a reviewer rating on the quality of the original translation and the error ridden translation;
         assigning a competency rating to the reviewer based on the reviewer rating of the error ridden translation;
         when a reviewer competency rating is below a threshold, then omitting by the processor the reviewer rating of the original translation when calculating a consensus quality rating of the plurality of remaining competent reviewers on the quality of the original human translation; and,
         wherein a user and the translation system are not required to know when ordering the original human translation: 1) the target language; 2) the reliability and accuracy of the human translator; and, 3) the reliability and accuracy of the reviewer within the plurality of reviewers;
   b. one of more human translator electronic computing devices for communicating over a network with the system server, and/or with one or more reviewer and customer electronic computing devices to perform translations of content;
   c. one or more reviewer electronic computing devices for communicating over a network with the system server, and/or with one or more translator and customer electronic computing devices for rating the quality of the translations;
d. one or more customer electronic computing devices for communicating over a network with the system server, and/or with one or more reviewer and translator electronic computing devices to order and receive translations and quality ratings of content;
e. an Internet network for transmitting electronic communications between the electronic computing devices and/or the server system; and,
f. wherein the content comprises one or more types of digital media comprising text, images, audio, or any combinations thereof.

2. The Internet based translation system of claim 1, wherein randomly inserting errors into the original translation further comprises breaking the original translation into parts comprising one or more of sentences, paragraphs, and strings, and inserting errors into the one or more of the parts.

3. The Internet based translation system of claim 2, wherein the translation is broken into parts by the processor before being translated.

4. The Internet based translation system of claim 1, further comprising methods of randomly inserting errors, and/or computing a number of reviewers needed, based on factors comprising one or more of: the importance of a customer ordering the original human translation; the importance of a project associated with the original human translation; and, the amount of time available before the deadline for the original human translation.

5. The Internet based translation system of claim 1, wherein assigning a competency rating further comprises calculating by the processor for the error ridden translation:
the number of errors detected, and/or missed, by a reviewer;
a reviewer relative rating for one or more parts, and/or the whole, as compared to the average, mean, median or mode rating of the plurality of reviewers; or,
generating different types of errors; assigning a relevancy weight designating the importance of each type; and computing a sum of all the weighted types of errors detected or missed.

6. A computer implemented method for ensuring the quality of human translations of content from a source language to a target language, comprising:
a. receiving by a processor an original human translation over a computer network and randomly inserting errors into the original human translation to create an error ridden translation;
b. transmitting by the processor the original translation, and the error ridden translation, to a plurality of human translation reviewers and receiving back a reviewer rating on the quality of the original translation and the error ridden translation;
c. assigning a competency rating to the reviewer based on the reviewer rating of the error ridden translation;
d. when a reviewer competency rating is below a threshold, then omitting by the processor the reviewer rating of the original translation when calculating a consensus quality rating of the plurality of competent reviewers on the quality of the original human translation; and,
e. wherein the content comprises one or more types of digital media comprising text, images, audio, or any combinations thereof; and, wherein a user and the processor are not required to know when ordering the original human translation: 1) the target language; 2) the reliability and accuracy of the human translator;
and, 3) the reliability and accuracy of the reviewer within the plurality of reviewers.

7. The computer implemented method of claim 6, wherein randomly inserting errors into the original translation further comprises breaking the original translation into parts comprising one or more of sentences, paragraphs, and strings, and inserting errors into the one or more of the parts.

8. The computer implemented method of claim 6, further comprising having the reviewer rate the quality of the translation for one or more of the parts.

9. The computer implemented method of claim 7, wherein randomly inserting errors into the original human translation further comprises one or more methods of: substituting a machine translation for one or more parts; switching two or more translated parts; and/or inserting a specific number of errors and/or type of errors.

10. The computer implemented method of claim 9, wherein randomly inserting errors, and computing a number of reviewers needed, is based on factors comprising one or more of: the importance of a customer ordering the original human translation; the importance of a project associated with the original human translation; and/or, the amount of time available before the deadline for the original human translation.

11. The computer implemented method of claim 6, wherein assigning a competency rating further comprises one or more methods calculating by the processor for the error ridden translation:
the number of errors detected, and/or missed, by a reviewer;
a reviewer relative rating for one or more parts, and/or the whole, as compared to the average, mean, median or mode rating of the plurality of reviewers; or,
generating different types of errors; assigning a relevancy weight designating the importance of each type; and computing a sum of all the weighted types of errors detected or missed.

12. The computer implemented method of claim 6, wherein the translation is broken into parts by the processor before being translated.

13. A computer program product, comprising a computer readable storage device having a non-transitory computer readable storage medium embodied therein, said non-transitory computer readable storage medium configured to perform the method of claim 6 upon being executed by a processor of a computer system.

14. A computer system comprising a processor and a computer readable memory unit coupled to the processor, said memory unit containing computer readable program code configured to be executed by the processor to perform the method of claim 6.

15. The computer program product of claim 6, wherein assigning a competency rating further comprises one or more methods of calculating by the processor for the error ridden translation:
the number of errors detected, and/or missed, by a reviewer;
a reviewer relative rating for one or more parts, and/or the whole, as compared to the average, mean, median or mode rating of the plurality of reviewers; and,
generating different types of errors; assigning a relevancy weight designating the importance of each type; and computing a sum of all the weighted types of errors detected or missed.

16. A computer program product tangibly embodied in a non-transitory computer-readable storage device and comprising instructions that, when executed by one or more processors, perform a method for ensuring the quality of human translations of content from a source language to a target language, the method comprising:

a. randomly inserting errors by a processor into an original human translation;

b. receiving by the processor an original human translation over a computer network and randomly inserting errors into the original human translation to create an error ridden translation;

c. transmitting by the processor the original translation, and the error ridden translation, to a plurality of human translation reviewers and receiving back a reviewer rating on the quality of the original translation and the error ridden translation;

d. assigning a competency rating to the reviewer based on the reviewer rating of the error ridden translation;

e. when a reviewer competency rating is below a threshold, then omitting by the processor the reviewer rating of the original translation when calculating the consensus quality rating of the plurality of competent reviewers on the quality of the original human translation; and, f. wherein a user and the processor are not required to know when ordering the original human translation: 1) the target language; 2) the reliability and accuracy of the human translator; and, 3) the reliability and accuracy of the reviewer within the plurality of reviewers.

17. The computer program product of claim 16, wherein randomly inserting errors into the original translation further comprises breaking the original translation into parts comprising one or more of sentences, paragraphs, and strings, and inserting errors into the one or more of the parts.

18. The computer program product of claim 16, further comprising having the reviewer rate the quality of the translation for one or more of the parts.

19. The computer program product of claim 16, wherein randomly inserting errors into the original human translation further comprises using one or more methods comprising: substituting a machine translation for one or more parts; switching two or more translated parts; and inserting a specific number of errors and/or type of errors.

20. The computer program product of claim 16, further comprising methods of randomly inserting errors, and computing a number of reviewers needed, based on factors comprising one or more of: the importance of a customer ordering the original human translation; the importance of a project ordering the original human translation; and the amount of time available before the deadline for the original human translation.

\* \* \* \* \*